United States Patent Office 3,010,061
Patented Nov. 21, 1961

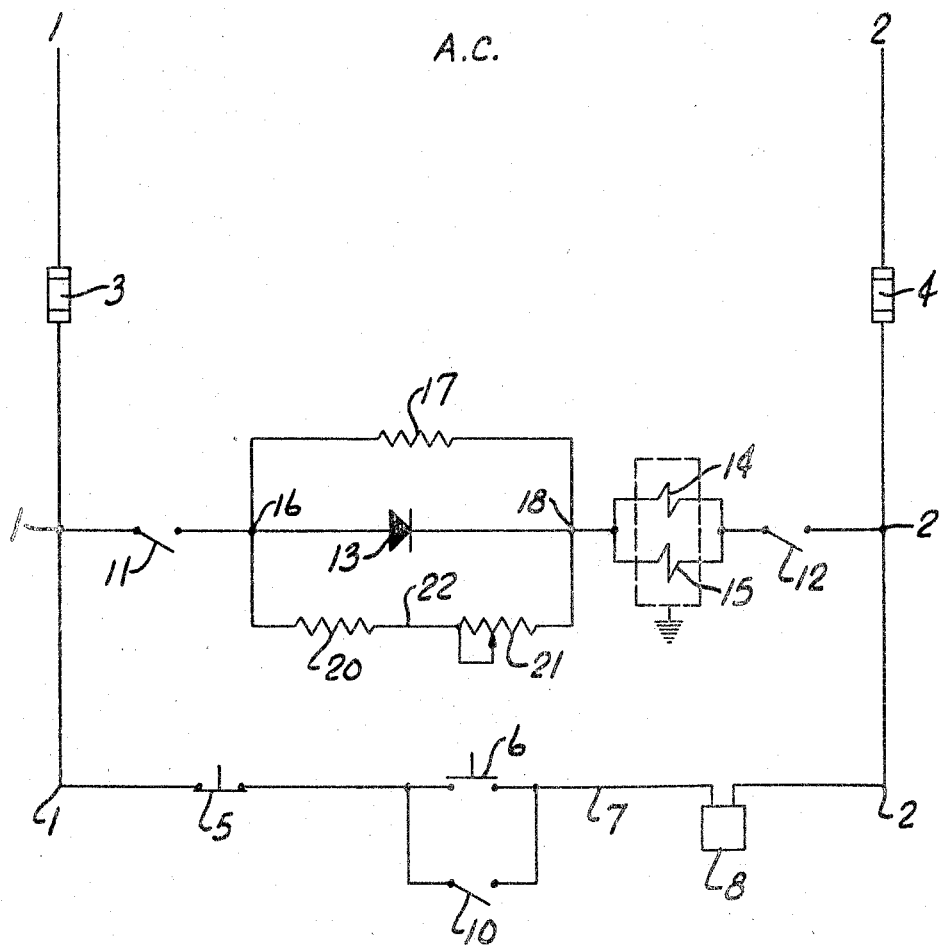

3,010,061
SHUNT RHEOSTAT CONTROL OF A VIBRATORY MOTOR
Ralph D. Burt, Homer City, Pa., assignor to Syntron Company, Homer City, Pa., a corporation of Delaware
Filed Mar. 7, 1960, Ser. No. 13,092
2 Claims. (Cl. 318—132)

This invention relates generally to controls for vibratory motors and more particularly for controls for use in conjunction with rectifiers for delivering pulsating current from an alternating current supply.

Most every type of vibratory equipment or other similar machine operated by an electromagnet is advantageously operated by a pulsating current rather than a full wave alternating current. This is usually accomplished by placing a rectifier in series with the electromagnet and across the alternating current supply through a suitable switch means. This rectifier may be of the vacuum tube type, vapor tube type or what is known as a dry rectifier which could be in the form of a monocrystalline wafer such as a silicon diode, a germanium rectifier, a selenium rectifier or a copper oxide rectifier. Such rectifiers when employed as diodes are required to assume the peak voltage across the system when the circuit is made or broken and in the case of the dry cell rectifier as against the tube type it is necessary to build up a series of diodes that will stand this peak voltage. A structure of this character is ordinarily employed in a circuit including a variable resistor in series with the electromagnetic device and the diode for the purpose of changing the voltage across the circuit and thereby control the operation of the electromagnetic motor whether it be a bin vibrator, a feeder or conveyor vibrator, a paper jogger or any number of similar applications. This is particularly advantageous with feeder conveyor vibrators as the change in voltage across the vibratory motor will vary the amplitude and thus the rate of feed of the vibrator.

As an example a 460 volt 60 cycle single phase circuit may require as many as eighteen selenium cells in series to supply the electromagnetic motor with sufficient voltage to operate the feeder. Such a rectifier can readily withstand the peak voltage and will not fail under variable loads at this voltage.

The principal object of this invention is the provision of a control which not only provides a safeguard for the rectifier from a peak voltage but also provides an adequate control of the rectified voltage supplied to the electromagnetic motor. This invention contemplates the use of a high resistance in multiple with the rectifier to permit the rectifier to be reduced in the number of cells insofar as the peak voltage is concerned. In other words, the resistance will permit the peak voltage to pass therethrough and thus permit the use of half the selenium rectifier cells than that required when the resistance is placed in series with the rectifier and the electromagnetic motor.

Another improvement in this invention is in the use of a second circuit in parallel with the rectifier which contains a limited low resistance in series with a variable resistance or potentiometer type resistor. The limited low resistance of this parallel circuit limits the A.C. voltage across the electromagnetic motor if the variable resistance is completely cut out. The reduction of the variable resistance decreases the A.C. voltage across the rectifier and thereby increases the amount of A.C. voltage supplied to the electromagnetic motor. Since this electromagnetic motor is ordinarily connected to a tuned system such as 3600 vibrations per minute then the increased A.C. voltage across the electromagnetic motor supplies pulsations at the rate of 7200 r.p.m. which in a system tuned to half this frequency has the effect of slowing down the operation of the electromagnetic motor, by the reduction of amplitude.

Other objects and advantages of this invention appear hereinafter in the following description and claims.

The accompanying drawings show for the purpose of exemplification without limiting this invention or the claims thereto, certain practical embodiments illustrating the principles of this invention wherein the view is a diagrammatic figure of the circuit control comprising this invention.

Referring to the drawings the A.C. supply line is indicated at 1 and 2 which in this instance is 460 volts of single phase 60 cycles. Each of the lines 1 and 2 is provided with a fuse 3 and 4. The line 1 is connected through a stop pushbutton 5 which is normally closed, a start pushbutton 6 which is normally open, from which a line 7 connects the current from line 1 directly to the relay controller 8, the other side of which is connected directly to the line 2. The relay controller 8 is provided with three front contacts one shown at 10 which is in multiple of the start pushbutton 6 and which maintains a stick or a holding circuit for the relay 8 until the same is interrupted by a power interruption or the stop pushbutton 5.

The control relay 8 also has the contact members 11 and 12 which connect the lines 1 and 2 through the rectifier 13 in series with the electromagnetic feeder motor coils 14 and 15 which are connected in multiple as indicated. The junction 16 on the apparatus side adjacent the contact 11 not only connects this contact with the rectifier 13 but also connects the resistance 17 in multiple with the rectifier 13 by means of the other junction 18.

The second multiple circuit is in the form of the resistor 20 and the variable resistor or potentiometer 21 which are connected between the junctions 16 and 18 by means of the line 22. Thus we have three parallel circuits between the junctions 16 and 18, the first being through the rectifier 13, the second through the resistor 17 and the third through the resistor 20 and the variable resistance 21 in series.

With the voltage of 460 volts and the electromagnetic feeder motor indicated by the coils 14 and 15 tuned to operate at 3600 vibrations per minute. The rectifier 13 would have to be approximately eighteen selenium cells but when the resistance 17 of approximately 500 ohms is placed in multiple therewith, the cells in the rectifier 13 may be reduced in number to approximately nine as the peak voltage will pass through the 500 ohm resistance and will not be appreciably effective on the electromagnetic vibratory motor.

This fifty percent reduction in the number of cells is materially advantageous not only economically but in operation as to cell life and of course the lower the number of cells the lower the concentration of heat energy, but in most instances it may be readily dissipated if necessary because of its reduction to half the voltage drop.

The resistor 20 would in the circuit given be approximately 2 ohms which prevents injury to the variable resistor which would preferably be wound as a taper type resistor having a higher resistance wire at the end adjacent the position where the total resistance is in the circuit and a materially lower resistance wire adjacent the end where only a few turns or laps are involved in the circuit. This variable resistor or potentiometer would have approximately 97 to 100 ohms. Thus the smallest limiting resistor in multiple with the rectifier would be the 2 ohm resistor if the variable resistance was completely cut out and if for some reason the variable resistance failed and produced an open circuit, then the fixed resistance 17 would always remain in multiple with the rectifier thereby preventing the rectifier from being subjected to an induced voltage.

The control of the electromagnetic motor by gradually changing the shape of the pulsating waves fed thereto provides an accurate and substantially linear control when the variable resistance 21 is made with varying size of resistance wire throughout its length or let us say a conical type variable resistance. The reduction of resistance across the rectifier merely increases the size of the alternating current wave that would ordinarily be blocked out by the diode and this wave form decreases the feed of the tuned motor even though the voltage across the coils 14 and 15 is increased although changing from half wave rectification to alternating current.

The idea of providing a fixed resistance in multiple with the diodes whether they be in a single or multiple legs, that is, a higher current device requiring more than one diode in multiple, is sufficient to reduce the number of diodes in series depending upon the character of the diode employed and will also take care of the peak voltage even though the diodes in the multiple legs may vary slightly as to characteristics. Thus the present circuit would be operable with additional diodes in multiple with the diode 13.

I claim:
1. A control circuit for an electromagnetic vibratory motor comprising a diode connected in series with the electromagnetic motor and supplied with an alternating current of proper voltage, a fixed resistance connected in multiple with the diode to absorb the peak alternating current voltages to reduce the voltage requirements of the diode, and an additional circuit in multiple with the diode and including a fixed resistance in series with a variable resistance.

2. A control circuit for an electromagnetic vibratory motor comprising a diode connected in series with the electromagnetic motor and supplied with an alternating current of proper voltage, a fixed resistance connected in multiple with the diode to absorb the peak alternating current voltages to reduce the voltage requirements of the diode, and an additional circuit in multiple with the diode including a variable resistance.

References Cited in the file of this patent
UNITED STATES PATENTS

| | | |
|---|---|---|
| 2,126,790 | Logan | Aug. 16, 1938 |
| 2,895,100 | Felberich et al. | July 14, 1959 |